(12) United States Patent
Beach-Drummond

(10) Patent No.: US 12,210,999 B2
(45) Date of Patent: *Jan. 28, 2025

(54) INTELLIGENT SYSTEM FOR AUTONOMOUS OPERATION OF MOBILE RETAIL STOREFRONTS

(71) Applicant: Main Grade Assets, LLC, Orlando, FL (US)

(72) Inventor: James Beach-Drummond, Winter Springs, FL (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/649,688

(22) Filed: Feb. 2, 2022

(65) Prior Publication Data

US 2022/0156695 A1    May 19, 2022

Related U.S. Application Data

(63) Continuation of application No. 16/988,994, filed on Aug. 10, 2020, now Pat. No. 11,392,887, which is a
(Continued)

(51) Int. Cl.
*G06Q 10/0835* (2023.01)
*G01C 21/34* (2006.01)
(Continued)

(52) U.S. Cl.
CPC ....... *G06Q 10/08355* (2013.01); *G01C 21/34* (2013.01); *G01S 19/38* (2013.01);
(Continued)

(58) Field of Classification Search
CPC .......... G06Q 10/08355; G06Q 10/087; G06Q 30/0603; G06Q 30/0633; G06Q 30/0635; G06Q 30/0641
See application file for complete search history.

(56) References Cited

U.S. PATENT DOCUMENTS 6,980,131 B1   12/2005   Taylor
7,455,225 B1   11/2008   Hadfield et al.
(Continued)

OTHER PUBLICATIONS

Relay Foods Offering Free Grocery Delivery with 'Drop Spots' Program, Sep. 29, 2013 (Sep. 29, 2013), Professional Services Close-Up Close-Up Media, Inc. (Year: 2013).*

(Continued)

*Primary Examiner* — Allison G Wood

(57) ABSTRACT

A network software system that enables the autonomous operation of mobile retail storefronts within a regional delivery area. The system connects local retailers with consumers by handling order placement, real-time inventory tracking, and delivery coordination. An order server communicates with the mobile storefronts to receive orders, determine consumer geolocation, calculate distances, and assign the closest mobile storefront based on proximity and available inventory. A mobile computer application aboard each storefront manages delivery scheduling, navigation, order processing, and intelligent communication with consumers, providing real-time updates and automated correspondence. The system supports various mobile inventories and automates all stages of order fulfillment, including the ability to direct mobile storefronts to areas with high concentrations of preferred customers. It is also capable of fully autonomous operation using self-driving technology.

24 Claims, 5 Drawing Sheets

Related U.S. Application Data continuation of application No. 15/648,732, filed on Jul. 13, 2017, now Pat. No. 10,796,272, which is a continuation of application No. 14/568,971, filed on Dec. 12, 2014, now Pat. No. 9,741,011.

(60) Provisional application No. 61/915,044, filed on Dec. 12, 2013.

(51) Int. Cl.
| | |
|---|---|
| *G01S 19/38* | (2010.01) |
| *G06Q 10/083* | (2023.01) |
| *G06Q 10/0834* | (2023.01) |
| *G06Q 10/087* | (2023.01) |
| *G06Q 30/0601* | (2023.01) |

(52) U.S. Cl.
CPC ....... *G06Q 10/083* (2013.01); *G06Q 10/0834* (2013.01); *G06Q 10/087* (2013.01); *G06Q 30/0603* (2013.01); *G06Q 30/0633* (2013.01); *G06Q 30/0635* (2013.01); *G06Q 30/0639* (2013.01); *G06Q 30/0641* (2013.01)

(56) References Cited

U.S. PATENT DOCUMENTS

| | | | |
|---|---|---|---|
| 10,796,272 B2 | 10/2020 | Beach-Drummond | |
| 2002/0099567 A1 | 7/2002 | Joao | |
| 2003/0200160 A1* | 10/2003 | Aruga | G06Q 10/087 705/28 |
| 2006/0235739 A1 | 10/2006 | Levis et al. | |
| 2007/0083410 A1 | 4/2007 | Hanna | |
| 2007/0095904 A1 | 5/2007 | Barta et al. | |
| 2008/0061966 A1 | 3/2008 | Nelson | |
| 2009/0099972 A1* | 4/2009 | Angert | G06Q 30/0633 705/26.1 |
| 2010/0076853 A1* | 3/2010 | Schwarz | G06Q 30/04 705/26.1 |
| 2011/0040642 A1 | 2/2011 | O'Dell | |
| 2012/0059712 A1* | 3/2012 | Stalker | H04L 63/0861 705/14.47 |
| 2012/0185363 A1 | 7/2012 | Gilbert | |
| 2012/0185404 A1 | 7/2012 | Koh | |
| 2012/0284083 A1 | 11/2012 | Wu et al. | |
| 2013/0030824 A1* | 1/2013 | Todary Michael | G06Q 10/06 705/2 |
| 2014/0129379 A1* | 5/2014 | Tryba | G06Q 30/0639 705/26.8 |
| 2014/0279217 A1 | 9/2014 | Stover | |
| 2015/0100403 A1 | 4/2015 | Roberts et al. | |
| 2015/0120094 A1* | 4/2015 | Kimchi | G06Q 10/083 701/3 |
| 2017/0124511 A1* | 5/2017 | Mueller | H04W 4/029 |
| 2017/0308852 A1 | 10/2017 | Beach-Drummond | |

OTHER PUBLICATIONS www.peapod.com. Oct. 4, 2007: https://web.archive.org/web/20071004160450; http://www.peapod.com/ *** See U.S. Appl. No. 16/988,994.

dieseldirect.com. Sep. 7, 2013; Diesel Direct—Supply, Deliver, Management 24/7 on Site Fueling; https://web.archive.org/web/20130907163844/http://dieseldirect.com/24-7-on-site-fueling *** See U.S. Appl. No. 16/988,994.

fromthefarmerdc.com. Jun. 8, 2013 ; https://web.archive.org/web/20130608110629/http://fromthefarmerdc.com/ *** See U.S. Appl. No. 16/988,994.

www.officedepot.com. Jul. 8, 2013; http://www.officedepot.com/a/customerservice/delivery/ *** See U.S. Appl. No. 16/988,994.

www.pharmaceuticaldelivery.com. Apr. 6, 2013: https://web.archive.org/web/20130406043224/ http://www.pharmaceuticaldelivery.com/index.php *** See U.S. Appl. No. 16/988,994.

Relay Foods Offering Free Grocery Delivery with 'Drop Spots' Program, Sep. 29, 2013 (Sep. 29, 2013), Professional Services Close-Up Close-Up Media, Inc. (Year: 2013) *** See U.S. Appl. No. 16/988,994.

Henshaw, Ashley "Chicago's Best Food Truck Apps and Websites" Jan. 23, 2013. https://www.thedailymeal.com/chicago-s-best-food-truck-apps-and-websites (Year: 2013) Published by The Daily Meal. *** See U.S. Appl. No. 16/988,994.

* cited by examiner

INTELLIGENT SYSTEM FOR AUTONOMOUS OPERATION OF MOBILE RETAIL STOREFRONTS

RELATED APPLICATIONS

This application is a continuation of application Ser. No. 16/988,994 filed Aug. 10, 2020, which is a continuation of U.S. Pat. No. 10,796,272 filed Jul. 13, 2017, which is a continuation of U.S. Pat. No. 9,741,011 filed Dec. 12, 2014, which claims the benefit of provisional application Ser. No. 61/915,044 filed Dec. 12, 2013, which are hereby incorporated herein in their entireties by reference.

FIELD OF THE INVENTION

The present invention relates generally to automated management systems for service industries, and more particularly, to systematic routing, fulfillment and payment controls for deliveries of consumer products.

BACKGROUND OF THE INVENTION

Successful delivery operations are dependent on applying efficient and strategic methods. Modern delivery practices, as such in the current art, often create opportunities for decreased efficiencies, by depending on delivery drivers to make certain decisions that affect the success of the delivery program. Left to their own devices, delivery drivers can make inefficient judgments in regard to operations and tasks such as scheduling, routing deliveries, locating addresses, and transacting money for deliveries. This often results in unsatisfied customers and an ultimate loss of revenues. For this reason, many businesses forego delivery services citing the complexities of management, and lack of profitability.

Inasmuch as efficiencies and logistics drive successful food delivery programs, preserving the quality and presentation of delivered food are equally paramount. Many restaurants are discouraged from offering delivery services for fear of delivering a substandard product. Time spent on the road during the delivery process is a disadvantage for prepared foods. Most food items when prepared hot will often wilt and become soggy when left in delivery containers for an extended period of time. Similarly, food items intended to be served cold can spoil and/or melt when left unrefrigerated. New technologies and methods that guarantee freshly prepared food for delivery would be highly valued in the restaurant industry.

Advancements in digital communications, mapping and navigation, mobile food preparations, and payment/transactional technologies can foreseeable be incorporated into a modernized food delivery management and operating system to minimize the exposure and risks for delivery drivers, and to increase productivity and profitability for restaurant owners. Based on the foregoing, it is believed that a need exists for a system and method to promote these benefits, as described in greater detail herein.

SUMMARY OF THE INVENTION

An object of the present invention is to increase efficiencies associated with delivery services by (i) providing an automated electronic management system for dispatching and routing delivery vehicles based on the location, quantity and proximity of customer delivery points within a defined delivery area, and (ii) deploying a network of self-contained mobile storefronts within a defined delivery area, that prepare and package orders from an inventory stored thereon, circumventing the need to return to the supplying brick and mortar business location to pick up each delivery order.

It is another object of the invention to improve customer service and enhance reliability of locally delivered items, by providing consumers with an automated ordering and communications system that keeps them informed of the status of their order.

According to the present invention, the above-stated objectives are achieved by combining, for system and method for improving safety and efficiency for delivery services, (i) an automated, credit-based, digital ordering interface, which can be accessed by consumers via a personal computer or a wireless device, (ii) a wireless, automated, dispatch and routing system, which operates in a defined closed circuit and governs a multitude of delivery vehicles, and (iii) a mobile order scheduling, preparation and expeditor program, which organizes and manages an aggregation of product orders for assembly by a fleet of mobile storefronts intended for delivery to customers.

Among the consumer benefits of the present invention is the use of the consumer's personal computer, cellular phone or other wireless communications device to: (i) select items to be delivered and specify a delivery address, (ii) instantly purchase items via an internal pre-paid credit system, (iii) receive estimated delivery times and arrival notifications, (iv) receive a sales receipt and acknowledgement of the order sent electronically, and (v) participate in customer satisfaction surveys and rewards programs, all through automated means and without the need to interact with a live company representative to process this information.

Among advantages of the present invention for restaurant operators is the ability to implement a fleet of vehicles, which operate both as (i) mobile kitchens—which process orders without the need to regularly return to the supplying restaurant to pick up food orders, and (ii) delivery vehicles—which incorporate advanced and consolidated technologies in communication, navigation, client management, and order fulfillment to increase the efficiencies of delivery service.

Equally as important to improving logistical efficiencies, is the ability for restaurants to guarantee that food is freshly prepared when a delivery is made. The fleet of mobile kitchens used in one embodiment the present invention, provide a strategic advantage by minimizing, if not entirely excluding, the hold time for prepared foods prior to a customer receiving the delivered product.

In addition, integrated client management software of the present invention provides an opportunity to foster long-term relationships between business owners and customers that frequently have items delivered.

Other desirable objectives, features, and advantages of the disclosed invention may occur or become apparent to those skilled in the art.

In one embodiment, an order and delivery system to be deployed over a regional delivery area includes a plurality of mobile storefronts operating autonomously within the regional delivery area, and an order server configured to communicate over a closed network with the plurality of mobile storefronts through a GPS-based routing program.

The order server may be further configured to receive an order from a consumer via an Internet connected device, determine the consumer's geolocation corresponding to the order based on location of the Internet connected device, and calculate via the GPS-based routing program distances between the consumer's geolocation and a current location of each of the plurality of mobile storefronts. The order server may send the order to one of the plurality of mobile storefronts over the closed network based on the calculated distances.

Each mobile storefront may include a transceiver configured to receive the order from the order server and to communicate with the consumer, a satellite receiver configured to determine the current location of the mobile storefront, and an onboard computer. The onboard computer may be configured to evaluate the current location and heading of the mobile storefront, provide navigation and routing on the consumer's geolocation, and send a message via the transceiver directly to the device used by the consumer to place the order. The message may include an arrival notification when the mobile storefront that received the order is within a pre-determined proximity to the consumer's geolocation. The mobile storefront receiving the order facilitates preparation of the order with its stored inventory for delivery to the consumer at the consumer's geolocation.

The onboard computer may be further configured to monitor in real-time inventory carried by the mobile storefront, estimate a time of arrival (ETA) of the order to the consumer's geolocation, and send a second message to the consumer via the transceiver that includes the ETA and a real-time inventory confirmation of the order.

Each autonomous mobile storefront may further include an expeditor terminal configured to facilitate access to the order within the mobile storefront.

The onboard computer for each autonomous mobile storefront may be further configured to deny the order response that results in a delivery service time that would exceed a pre-defined maximum allowable time limit.

The order server may be further configured to organize, manage, and assemble an aggregation of products by a plurality of autonomous mobile storefronts for delivery to a consumer.

The onboard computer for each autonomous mobile storefront may be further configured to operate an automated navigation program to route the autonomous mobile storefront to a preferred destination based on at least one of a desired location, quantity, and proximity of customers within a defined delivery area.

The onboard computer for each autonomous mobile storefront may be further configured to operate a client management program that identifies preferred customers based on frequency of orders.

At least one of the autonomous mobile storefronts may be configured as a self-driving vehicle. Each autonomous mobile storefront may be configured to travel by at least one of land, air, and water.

The Internet connected device used by the consumer may be configured as a personal electronic device.

The consumer's geolocation may be at least one of a physical address and a non-physical address.

The order server may be further configured to receive payment from the consumer so as to prepay for the order prior to delivery.

The onboard computer for each autonomous mobile storefront may be configured to receive traffic conditions, and with the navigation and routing on the consumer's geolocation being provided based on the received traffic conditions.

The onboard computer for each autonomous mobile storefront may be configured to generate a status report that takes into account inventory usage and fuel consumption of the autonomous mobile storefront.

The stored inventory for each autonomous mobile storefront may include office products, and with the order being an office products order.

The stored inventory for each autonomous mobile storefront may include stored food items, and with the order being a meal order. Each autonomous mobile storefront may include a mobile kitchen, with each mobile kitchen comprising storage for the food items and kitchen equipment useable to prepare the meal order from the stored food items.

The stored inventory for each autonomous mobile storefront may include fuel, and with the order being a fuel supply order. The fuel supply order may include at least one of liquid fuel, fuel gas, biofuel, fuel derived from electric fuel cells, and alternative fuels.

The stored inventory for each autonomous mobile storefront may include fresh produce, and with the order being a fresh produce order.

The stored inventory for each autonomous mobile storefront may include pharmaceutical products, and with the order being a prescription order.

The stored inventory for each autonomous mobile storefront may include grocery products, and with the order being a grocery products order.

BRIEF DESCRIPTION OF THE DRAWINGS

Aspects of the present invention will now be described with reference to the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
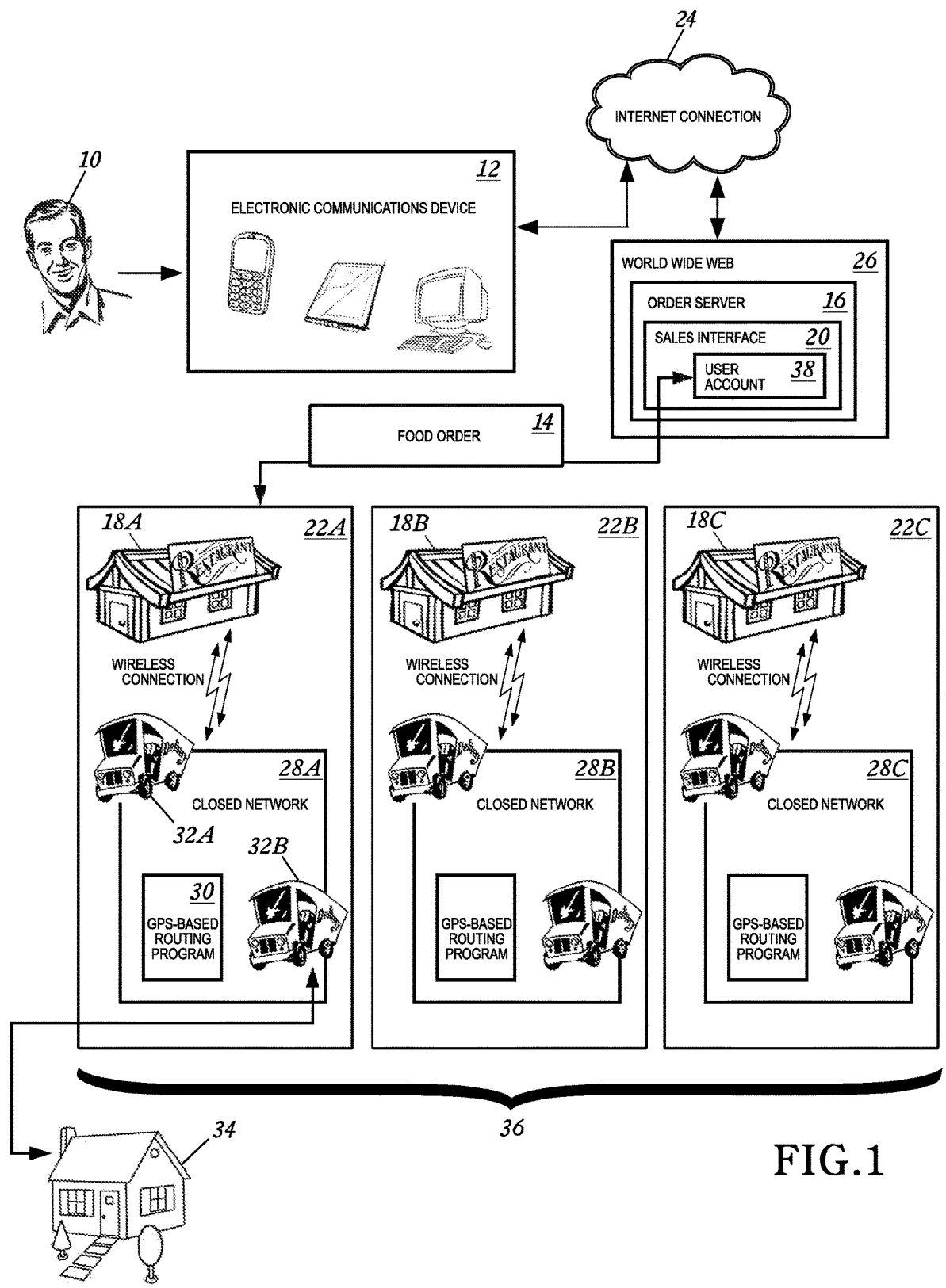
FIG. 1 is a pictorial diagram depicting a network of regional delivery units operated by a restaurant chain in accordance with an embodiment of the present invention.

Referring now to the figures and in particular to FIG. 1, a food order fulfillment and delivery system deployed over regional delivery areas in accordance with an embodiment of the present invention is shown. Specifically, the illustrated system encompasses mechanisms and methodologies for selling food items, then expediting, assembling and delivering food items using a network of mobile storefronts.

FIG. 1 depicts an overview of the order and delivery process originating with a consumer's demand and finalizing with the delivery of food to a specified geolocation. Various components of specific importance to the illustration are located at various positions within the figure. In particular, a consumer 10 is depicted using an electronic communications device 12 (or personal electronic device) to communicate with a restaurant chain 36 through an Internet connection 24 to place a food order 14 using a web application located on an order server 16 hosted on the World Wide Web 26. The consumer 10 accesses the restaurant's electronic sales interface 20 and completes the purchase through a personal user account 38.

A series of restaurants 18A-18C operate collectively to form a restaurant chain 36. When a food order 14 is finalized by the consumer 10, a computer program located on the order server 16 uses the global positioning system (GPS) to calculate a distance between the consumer's delivery destination 34 and the locations of the restaurants 18A-18C defining the restaurant chain 36 so as to select the closest restaurant. Data containing the food order 14 is then wirelessly sent to the nearest delivery vehicle 32 relative to the delivery destination 34. If it is determined that the nearest delivery vehicle will be delayed, then a next nearest delivery vehicle is determined.

Each restaurant 18A-18C within the chain 36 operates a fleet of mobile kitchens 28A-28C that prepare and deliver food items. A single restaurant 18A within the chain 36 and the entirety of its designated mobile kitchens 32A-323 form a regional delivery unit 22A that communicates over a closed network through a GPS-based routing program 30. Multiple regional delivery units 18A-18C of the restaurant chain 36 can operate in the same market area, but not impede upon each other's delivery areas.

A highly responsive on-demand system is provided that can service consumers more quickly and efficiently than systems for food delivery in the current art. Integrated computer algorithms used in onboard delivery systems ensure heightened efficiencies by managing logistical decisions regarding routing and delivery scheduling, and minimizing opportunities for human error. Mobile kitchens have the ability to both prepare and deliver food orders, and can remain in a regional delivery area without the need to frequently return to a supplying restaurant to receive each food order. Such is not the case with typical deliver-only vehicles such as used throughout the restaurant delivery industry in the current art.

Figure 2:
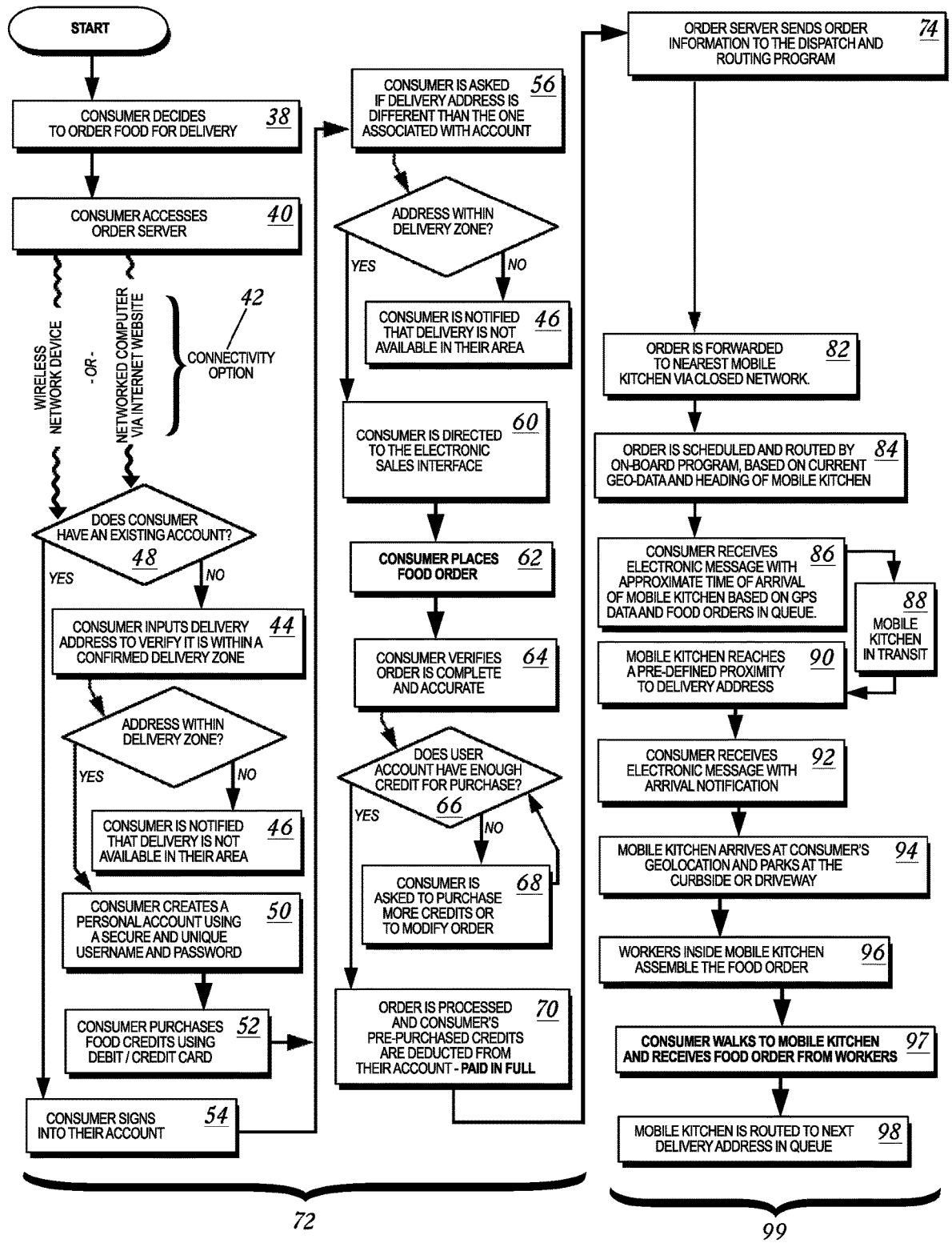
FIG. 2 is a flowchart depicting operation of a networked sales and food delivery system in accordance with an embodiment of the invention.

Referring now to the steps shown in FIG. 2, a system and method in accordance with an embodiment of the invention is depicted in a flowchart. When a consumer decides to order food from a restaurant chain for delivery (step 38), the consumer accesses the order server (step 40) using either a wireless network device or desktop computer, which individually define a connectivity option 42. If the consumer has an existing online account with the program (decision 48) then the consumer is directed to sign into their account (step 54). If the consumer does not have a pre-existing account, they are then asked to provide a delivery address (step 44) to ensure delivery is available in the area. If delivery is not available, the consumer is notified of such (step 46). However, if delivery is available for the address then the consumer is prompted to create a personal, online user account (step 50) using a secure and unique username and password.

Once an account is established, a user is directed to purchase pre-paid food credits prior to making an order (step 52). Food credits are purchased by any traditional means such as through use of credit cards or online bank accounts. Credits can be offered for purchase at variable prices in correlation with specific promotions offered by the restaurant chain from time to time. Additionally, credits can be offered at a discount when purchased in bulk quantities.

Once a consumer successfully signs into their account to arrange an order for delivery (step 54), the consumer is asked to verify whether or not the intended delivery address is the same as the address associated with the account (step 56), such as a home or business address used to establish the account. The intended delivery address is plotted by a mapping program to ensure it is within an established delivery area. If the address is within an established delivery area the consumer is directed to an electronic sales interface within the web application (step 60). If the address is not within the established delivery area, the consumer is notified that delivery is not available (step 46).

After the consumer places the entirety of the food order (step 62) they are asked to verify whether the order is complete and accurate (step 64). The program determines if consumer's account contains enough pre-paid credit to make the purchase (decision 66). If so, the order is processed and an appropriate amount of credits are deducted from the consumer's pre-paid account (step 70). If there is not enough credits, then the consumer is asked to purchase additional credits or to modify the order (step 68). Steps 38 through 70 generally define the delivery ordering process 72 in accordance with an embodiment of the invention.

At the time a consumer's food order is processed for delivery, a program within the order server sends the order information to a network restaurant located nearest to the consumer's delivery address (step 74). A store unit dispatcher receives the order information via a networked computer terminal and reviews the content for validity and accuracy (step 76). If the order is not accurate or was routed to the wrong network restaurant by mistake (decision 78), the dispatcher can send the order to the appropriate restaurant within the chain, or contact the consumer to make any corrections as needed (step 80).

If the consumer's food order is accurate, the dispatcher approves the order and forwards the content via a wireless connection to a mobile kitchen operating in the restaurant's fleet (step 82). It is the responsibility of the store unit dispatcher to determine which mobile kitchen within the fleet receives the food order, based on variables such as current location, heading, and quantity of backlogged orders, etc. Alternatively, a server hosting the web applications 16 and which interfaces with the Internet 24 may make this determination.

When a mobile kitchen receives a food order from a store unit dispatcher, it is processed by an onboard computer, and evaluated along with other food orders in queue. The food order is booked and routed via an integral scheduling and mapping program based on several real time variables, such as geolocation, heading, and traffic conditions (step 84). Geolocation is the process or technique of identifying the geographical location of a person (i.e., consumer) using digital information processed via the Internet, as readily appreciated by those skilled in the art. Built-in algorithms within the scheduling and mapping program do not allow a scheduled delivery time to exceed a pre-defined maximum allowable limit from the time the order was placed.

At the time a mobile kitchen schedules a food order, an electronic message is sent to the consumer with an estimated time of delivery based on several real time variables calculated by the mobile kitchen's onboard computer (step 86). The consumer can receive this electronic message via email, text messaging, automated phone call, or any other electronic message conveyance known in the art. As the mobile kitchen is in transit (step 88) the onboard computer continually monitors its location via the vehicle's transponder and GPS program. Once the mobile kitchen arrives within a pre-defined proximity of the delivery address (step 90), the consumer receives a second electronic message with an arrival notification (step 92).

At this point, the mobile kitchen arrives at the delivery address and parks in front of the consumer's home or business; usually at the curbside, in the driveway, or within a parking lot (step 94). Upon arrival, workers inside the mobile kitchen assemble the consumer's food order based on information sent to an expeditor terminal within the vehicle (step 96). Once notified by the electronic message, the consumer is prompted to meet the mobile kitchen outside their home or business to receive the food order. The consumer receives the food order immediately after it was assembled, guaranteeing optimal freshness and an uncompromised presentation (step 97).

Given the fact that delivery workers are not required to leave the relative safety of their delivery vehicle to deliver food items, a generally safer work condition is created over delivery techniques in the current art that require delivery drivers to leave their vehicles to exchange a food order at a customer's door. In the event that a customer cannot meet the delivery vehicle at the curbside, advanced arrangements can be made for the delivery driver to leave the order in a pre-determined holding place, such as a customer's mailbox or other secured location.

After a successful delivery, the mobile kitchen is routed to the next delivery location by the onboard computer and the process is repeated. Steps 74 through 98 generally define the delivery fulfillment system 99 in accordance with an embodiment of the invention.

Figure 3:
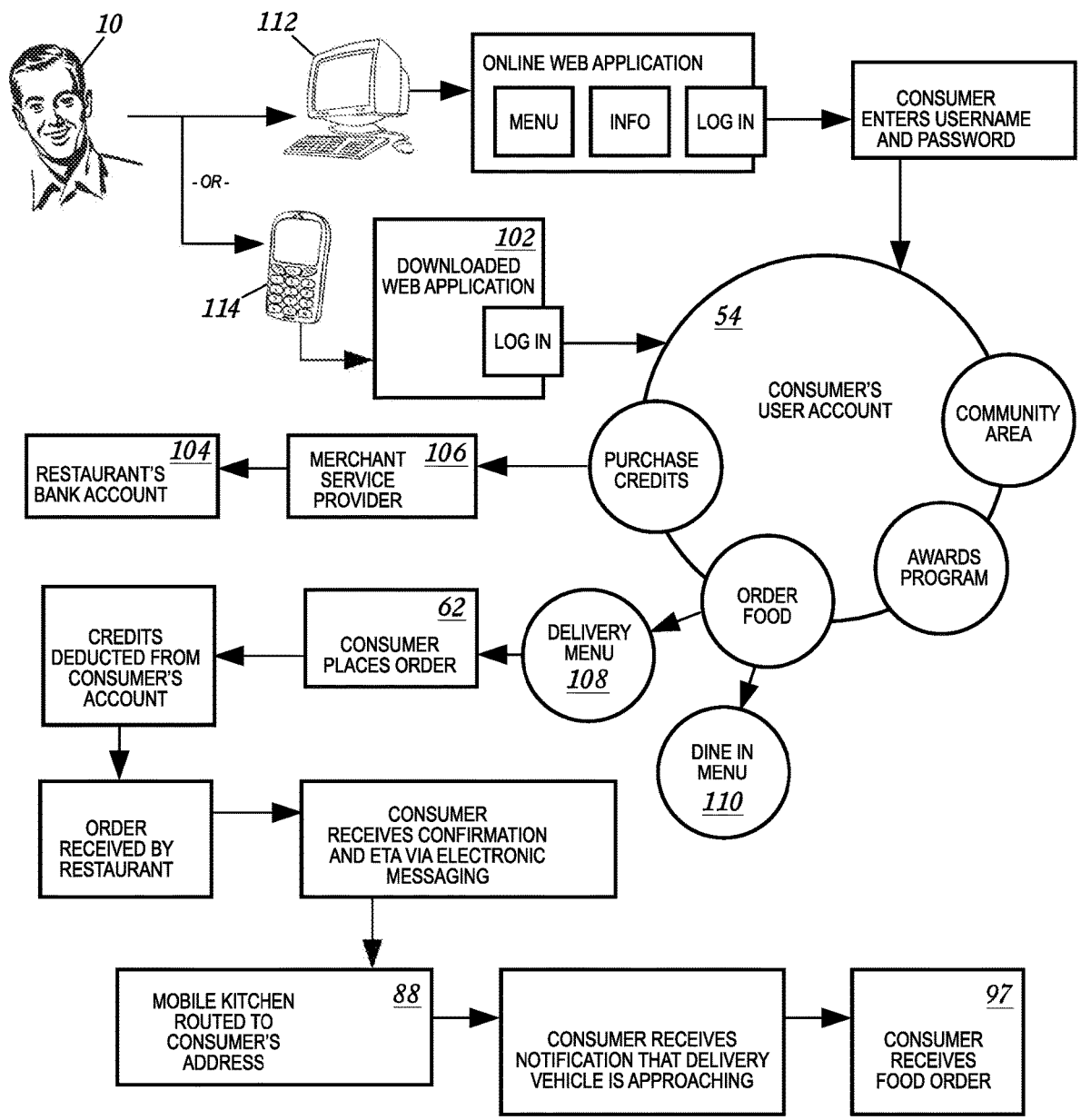
FIG. 3 is a pictorial diagram depicting a networked system for ordering and purchasing delivered foods, in which an embodiment of the invention is practiced.

FIG. 3 depicts an alternative view of a networked computer system for ordering and purchasing delivered foods as a pictorial diagram, in which an embodiment of the invention is practiced. A consumer 10 wanting to place an order for delivered food items connects to an online web application through use of a networked computer 112 or a wireless device 114. If using a wireless device such as a smart phone or tablet, the consumer can download a proprietary mobile application 102 to connect with the consumer's user account 54.

A consumer's user account serves as a portal to manage a variety of tasks and functions within the restaurant's web application. Most importantly, a consumer is able to securely purchase pre-paid credits for food items using a merchant service provider 106 which manages financial transactions, clears payments and makes deposits in the restaurant's bank account 104.

A consumer 10 can access a restaurant chain's web application to place food orders for both delivery 108 and dine-in 110 services. When dining in at a chain's restaurant location, consumer 10 can bypass the ordering line at the counter and proceed immediately to a seat within the restaurant. Once seated, the consumer can both order and prepay using a wireless device by accessing the restaurant's web application. After inputting the table number where the consumer is seated, a food expeditor will bring the entirety of their order to the table when ready. Alternatively, if a consumer uses the web application to place an order for delivery 62, a mobile kitchen is routed to the consumer's delivery address 88 and they receive the food order directly from the delivery vehicle 97.

Figure 4:
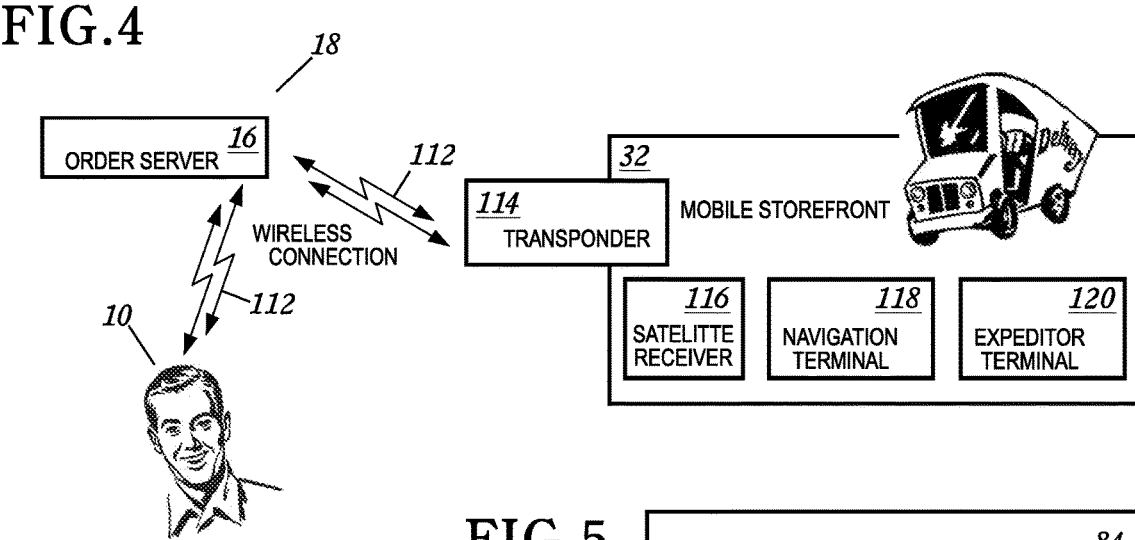
FIG. 4 is a pictorial diagram depicting a wireless system between a business and a mobile storefront, in which an embodiment of the invention is practiced.

FIG. 4 shows a pictorial diagram depicting a wireless communications system with information traveling from a consumer 10 to an order server 16 and to a mobile storefront 32 by use of a wireless connection 112. The mobile storefront receives all communications and transmits its location through a 2-way transponder 114 located within the vehicle. A satellite receiver 116 receives signals required for GPS-based software.

An onboard computer within the mobile storefront uses a program to manage deliveries received over a wireless network. Once a delivery is sorted and scheduled by the program, the delivery address is sent to an onboard navigation terminal 118, and the details of the order are sent to an expeditor terminal 120. Workers in the mobile storefront use the information presented on these terminals to navigate to various delivery addresses, and to prepare delivery orders for pick up by consumers at the mobile storefront's vending window.

Figure 5:
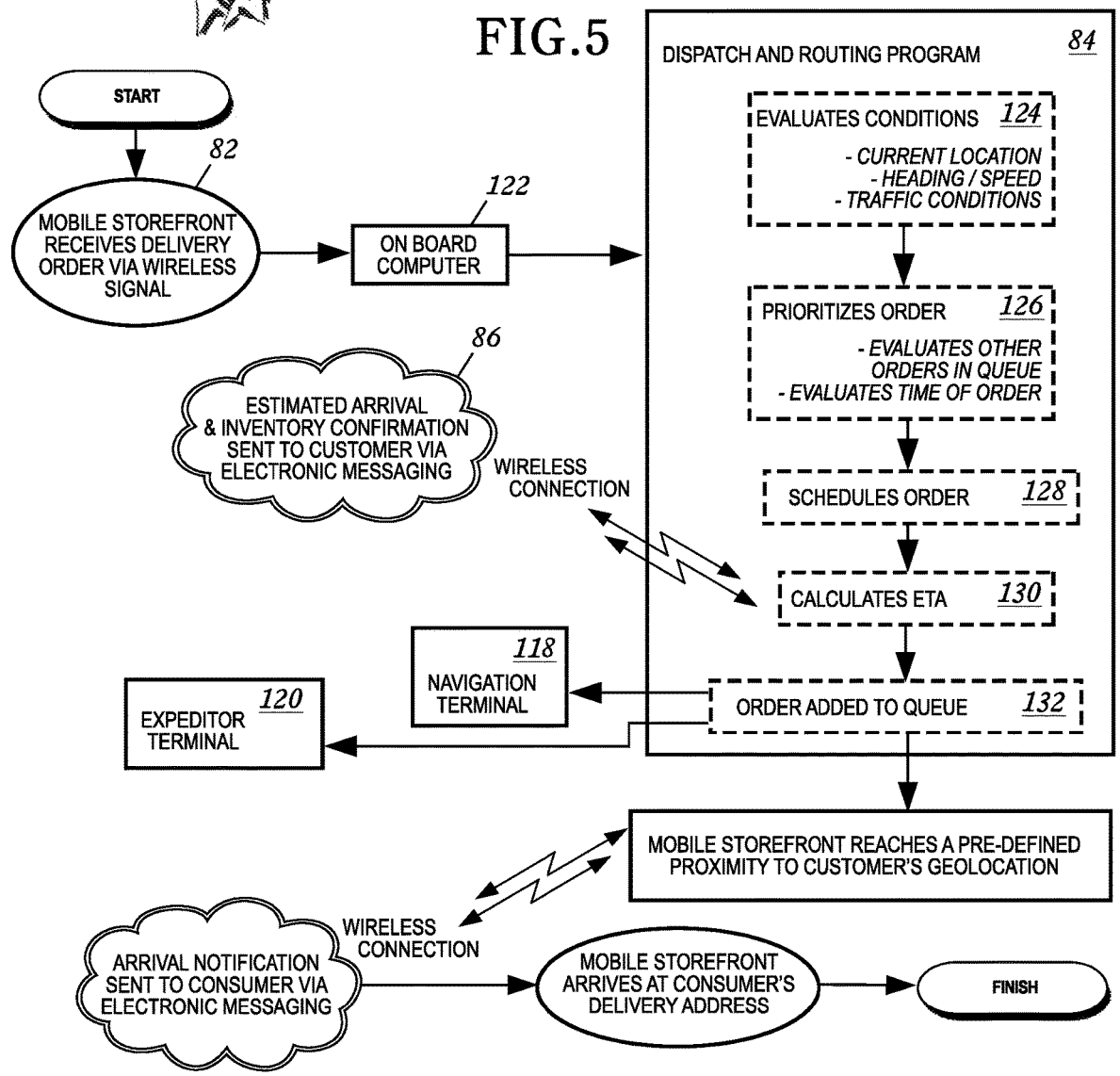
FIG. 5 is a block diagram depicting the operation of a vehicle-based dispatch and routing system in accordance with an embodiment of the invention.

FIG. 5 is a block diagram depicting the operation of a vehicle-based dispatch and routing system in accordance with an embodiment of the invention. Once a mobile storefront receives a delivery order via a wireless signal 82, it is processed by an onboard computer 122 and vetted through a dispatch and routing program 84. The program first evaluates various conditions 124 affecting the mobile storefront; such as the current location, heading and speed, traffic and weather conditions, road closures, etc. These details are provided by third party real-time mapping and navigation technologies.

Next, the order is prioritized 126 against other orders in queue, based on the various present conditions 124 as previously analyzed. Once a position within the order priority is established, the program schedules the order 128 and calculates the estimated time of arrival 130 to the delivery location. The estimated time of arrival is sent to the consumer along with real time inventory confirmation 86 via a wireless signal. The order is added to the queue 132 of other delivery orders, and data is sent to the onboard navigation 118 and expeditor 120 terminals.

Figure 6:
FIG. 6 depicts a method of the invention in which a mobile storefront delivers to a location with a physical address.

FIG. 6 depicts an aspect of the invention in which a mobile storefront, such as a mobile kitchen 136 makes a delivery to a customer's location with a physical address 137 such as a home or business.

Figure 7:
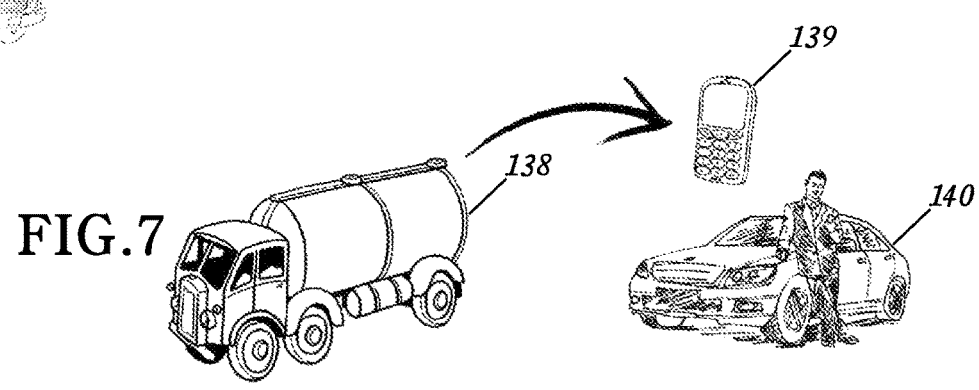
FIG. 7 depicts a method of the invention in which a mobile storefront delivers to a location without a physical address.

FIG. 7 depicts another aspect method of the invention in which a mobile storefront, such as a gas tanker 138 makes a delivery to a customer's exact geolocation without a physical address 140 such as a roadside, a beach, or a park, using broadcasted geodata from a customer's wireless networked device 139.

Figure 8:
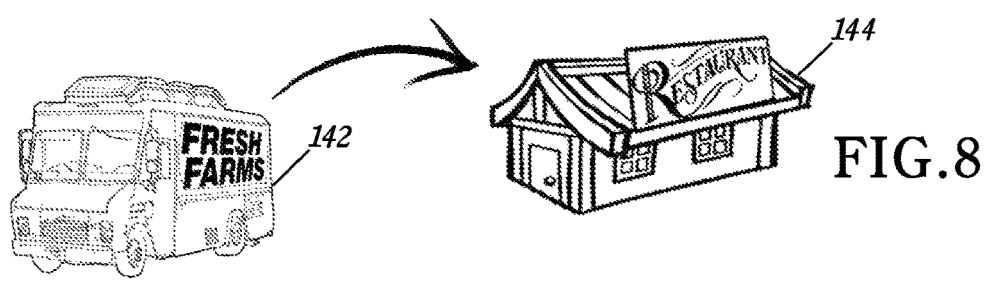
FIG. 8 depicts an occurrence when stored inventory is being delivered to a wholesale customer.

FIG. 8 depicts an occurrence when stored inventory is being delivered to a wholesale customer such as from a produce supplier 142 to a restaurant 144.

Figure 9:
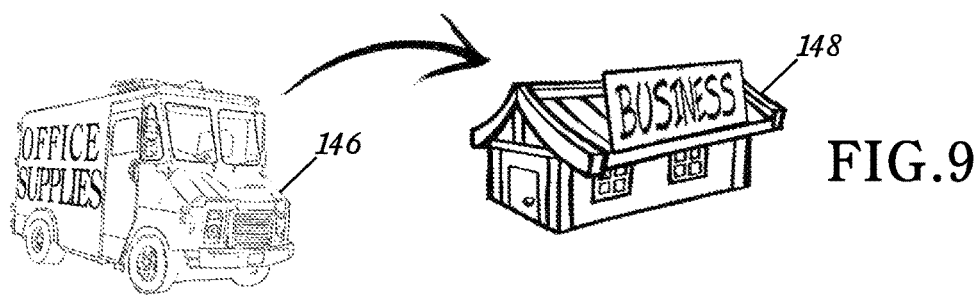
FIG. 9 depicts an occurrence when stored inventory is being delivered to an end user.

FIG. 9 depicts an occurrence when stored inventory is being delivered to an end user such as from an office supply retailer 146 to a business 148.

Although not illustrated, the stored inventory items may include pharmaceutical products, with the plurality of associated businesses defining a pharmacy chain, and with the order being a prescription order. Similarly, the stored inventory for each mobile storefront includes grocery products, with the plurality of associated businesses defining a grocery store chain, and with the order being a grocery products order.

While the present application includes a detailed description of the preferred embodiment of the invention, the invention in its broader aspects is not limited to the specific details, representative systems and methods, and illustrative examples shown and described. Additional advantages and modifications will be readily apparent to those skilled in the art, and are intended to be included within the scope of the appended claims.

The invention claimed is:

1. An order and delivery system to be deployed over a regional delivery area comprising:
   a plurality of mobile storefronts operating autonomously within the regional delivery area; and
   an order server configured to communicate over a closed network with said plurality of mobile storefronts through a GPS-based routing program, with said order server further configured to perform the following:
      receive an order from a consumer via an Internet connected device,
      determine the consumer's geolocation corresponding to the order based on location of said Internet connected device, and
      calculate via the GPS-based routing program distances between the consumer's geolocation and a current location of each of said plurality of mobile storefronts, and send the order to one of said plurality of mobile storefronts over the closed network based on the calculated distances;
   each mobile storefront comprising:
      a transceiver configured to receive the order from said order server and to communicate with the consumer, and to determine the current location of the mobile storefront, and
      an onboard computer configured to perform the following:
         evaluate the current location and heading of said mobile storefront,
         provide navigation and routing on the consumer's geolocation, and send a message via said transceiver directly to the device used by the consumer to place the order, with the message including an arrival notification when said mobile storefront that received the order is within a pre-determined proximity to the consumer's geolocation, and
         generate a status that takes into account inventory usage of said autonomous mobile storefront;
      said mobile storefront receiving the order facilitates preparation of the order with its stored inventory for delivery to the consumer at the consumer's geolocation.

2. The order and delivery system according to claim 1 wherein said onboard computer is further configured to perform the following:
   monitor in real-time inventory carried by said mobile storefront;
   estimate a time of arrival (ETA) of the order to the consumer's geolocation; and
   send a second message to the consumer via said transceiver that includes the ETA and a real-time inventory confirmation of the order.

3. The order and delivery system according to claim 1 wherein each autonomous mobile storefront further comprises an expeditor terminal configured to facilitate access to the order within said mobile storefront.

4. The order and delivery system according to claim 1 wherein said onboard computer for each autonomous mobile storefront is further configured to deny the order response that results in a delivery service time that would exceed a pre-defined maximum allowable time limit.

5. The order and delivery system according to claim 1 wherein said order server is further configured to organize, manage, and assemble an aggregation of products by a plurality of autonomous mobile storefronts for delivery to a consumer.

6. The order and delivery system according to claim 1 wherein said onboard computer for each autonomous mobile storefront is further configured to operate an automated navigation program to route said autonomous mobile storefront to a preferred destination based on at least one of a desired location, quantity, and proximity of customers within a defined delivery area.

7. The order and delivery system according to claim 1 wherein said onboard computer for each autonomous mobile storefront is further configured to operate a client management program that identifies preferred customers based on frequency of orders.

8. The order and delivery system according to claim 1 wherein at least one of said autonomous mobile storefronts is configured as a self-driving vehicle.

9. The order and delivery system according to claim 1 wherein each autonomous mobile storefront is configured to travel by at least one of land, air, and water.

10. The order and delivery system according to claim 1 wherein the Internet connected device used by the consumer comprises a personal electronic device.

11. The order and delivery system according to claim 1 wherein the consumer's geolocation is at least one of a physical address and a non-physical address.

12. The order and delivery system according to claim 1 wherein said order server is further configured to receive payment from the consumer so as to prepay for the order prior to delivery.

13. The order and delivery system according to claim 1 wherein said onboard computer for each autonomous mobile storefront is configured to receive traffic conditions, and with the navigation and routing on the consumer's geolocation being provided based on the received traffic conditions.

14. The order and delivery system according to claim 1 wherein the status further includes fuel consumption of said autonomous mobile storefront.

15. The order and delivery system according to claim 1 wherein the stored inventory for each autonomous mobile storefront comprises office products, and with the order being an office products order.

16. The order and delivery system according to claim 1 wherein the stored inventory for each autonomous mobile storefront comprises stored food items, and with the order being a meal order.

17. The order and delivery system according to claim 16 wherein each autonomous mobile storefront comprises a mobile kitchen, with each mobile kitchen comprising storage for the food items and kitchen equipment useable to prepare the meal order from the stored food items.

18. The order and delivery system according to claim 1 wherein the stored inventory for each autonomous mobile storefront comprises fuel, and with the order being a fuel supply order.

19. The order and delivery system according to claim 18 wherein said fuel supply order comprises at least one of liquid fuel, fuel gas, biofuel, fuel derived from electric fuel cells, and alternative fuels.

20. The order and delivery system according to claim 1 wherein the stored inventory for each autonomous mobile storefront comprises fresh produce, and with the order being a fresh produce order.

21. The order and delivery system according to claim 1 wherein the stored inventory for each autonomous mobile storefront comprises pharmaceutical products, and with the order being a prescription order.

22. The order and delivery system according to claim 1 wherein the stored inventory for each autonomous mobile storefront comprises grocery products, and with the order being a grocery products order.

23. An order and delivery system to be deployed over a regional delivery area comprising:
a plurality of mobile storefronts operating autonomously within the regional delivery area; and
an order server configured to communicate over a closed network with said plurality of mobile storefronts through a GPS-based routing program, with said order server further configured to perform the following:
receive an order from a consumer via an Internet connected device,
determine the consumer's geolocation corresponding to the order based on location of said Internet connected device, and
calculate via the GPS-based routing program distances between each of said plurality of mobile storefronts, and send the order to one of said plurality of mobile storefronts over the closed network based on the calculated distances;
each mobile storefront comprising:
a transceiver configured to determine the current location of the mobile storefront, and
an onboard computer configured to perform the following:
evaluate the current location and heading of said mobile storefront, and
operate an automated navigation program to route said autonomous mobile storefront to a preferred destination based on at least one of a desired location, quantity, and proximity of customers within a defined delivery area, and send a message via said transceiver directly to the device used by the consumer to place the order, with the message including an arrival notification when said mobile storefront that received the order is within a pre-determined proximity to the consumer's geolocation; and
said mobile storefront receiving the order facilitates preparation of the order with its stored inventory for delivery to the consumer at the consumer's geolocation.

24. An order and delivery system to be deployed over a regional delivery area comprising:
a plurality of mobile storefronts operating autonomously within the regional delivery area; and
an order server configured to communicate over a closed network with said plurality of mobile storefronts through a GPS-based routing program, with said order server further configured to perform the following:
receive an order from a consumer via an Internet connected device,
determine the consumer's geolocation corresponding to the order based on location of said Internet connected device, and
calculate via the GPS-based routing program distances between each of said plurality of mobile storefronts, and
send the order to one of said plurality of mobile storefronts over the closed network based on the calculated distances;
each mobile storefront comprising:
a transceiver configured to determine the current location of the mobile storefront, and
an onboard computer configured to perform the following:
evaluate the current location and heading of said mobile storefront, and
operate a client management program that identifies preferred customers based on frequency of orders, and
provide navigation and routing on the consumer's geolocation, and send a message via said transceiver directly to the device used by the consumer to place the order, with the message including an arrival notification when said mobile storefront that received the order is within a pre-determined proximity to the consumer's geolocation,
said mobile storefront receiving the order facilitates preparation of the order with its stored inventory for delivery to the consumer at the consumer's geolocation.

* * * * *